Jan. 23, 1951 V. T. MEAGHER 2,538,975
ADJUSTABLE MOUNTING DEVICE FOR
AUTOMOBILE LICENSE PLATES
Filed July 5, 1949

VIRGIL T. MEAGHER
*INVENTOR.*

BY

Bertha L. M^ac Gregor
Attorney

Patented Jan. 23, 1951

2,538,975

UNITED STATES PATENT OFFICE 2,538,975

ADJUSTABLE MOUNTING DEVICE FOR AUTOMOBILE LICENSE PLATES

Virgil T. Meagher, Waverly, Iowa

Application July 5, 1949, Serial No. 103,008

3 Claims. (Cl. 24—201)

This invention relates to adjustable mounting devices for automobile license plates.

The main object of the invention is to provide adjustable mounting devices which are adapted to secure automobile license plates of different sizes and shapes to the conventional frame supports provided on automobiles for this purpose, without the aid of threaded bolts, nuts or screws. Fastening means such as threaded bolts and screws become rusted, are difficult to remove when replacement of the license plates is required, and frequently wear in use with the result that the license plates are not securely held in place relatively to their supports, and objectionable noise and vibration occur. The mounting devices of my invention overcome these objections.

The adjustable mounting device embodying my invention is designed to bear yieldingly on the face of the license plate for the purpose of holding the plate against its support and for preventing relative movement between the plate and support. The mounting device is threadless. It is held in operative position by retaining means made of soft metal, such as lead, pot metal or the like. The retaining means not only hold the parts together in assembled relationship, but because of the character of the soft metal composing it, provide rustless and yielding means for holding the license plate on its frame support efficiently and noiselessly.

Another important advantage of my invention is the fact that no tools are required for placing my mounting device into operative position relatively to a license plate or for removing it.

Other objects and advantages will be apparent from the following description.

Figure 1:
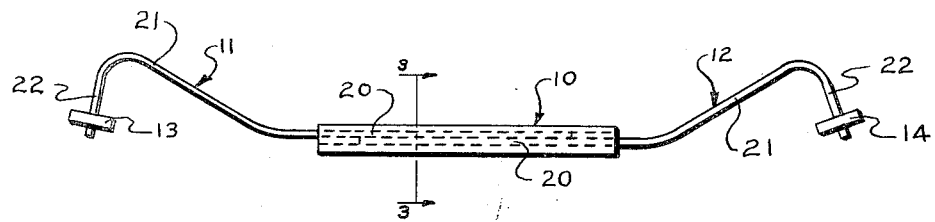
Fig. 1 is a top plan view of the mounting device as it appears before it is put into operative position relatively to a license plate and support.

In the preferred embodiment of the invention shown in the drawings, the adjustable mounting device for securing automobile license plates to supporting frames conventionally provided on automobiles, comprises five separate parts, namely: a central elongated sleeve member 10, two identical spring metal arms 11 and 12, and two identical retaining members 13 and 14 made of soft metal, such as lead, pot metal or the like.

The sleeve 10 preferably is about three inches in length and internally wide enough to receive the inner ends of the spring metal arms 11 and 12. The sleeve 10 is made of a single piece of galvanized sheet iron or other metal, such as aluminum, die stamped to form walls 15, 16, 17, 18 and 19, which form a four sided open ended tubular member which fits snugly around the superposed bodies of the straight inner ends of the spring metal arms 11 and 12. The sleeve 10 has a width slightly greater than that of the spring arm 11 or 12, and a depth slightly greater than the combined thicknesses of said arms, forming an internal chamber adapted to slidingly house the ends of said arms.

The spring metal arms 11 and 12 are identical. Each consists of a relatively thin and flat, elongated piece of spring metal, bent to provide a straight inner end member 20, an outwardly directed portion 21 and an inwardly directed portion 22, the latter terminating in a reduced shank 23 and terminal 24. The inner end members 20 of the arms 11, 12, are straight and parallel to each other, disposed in surface contacting, superposed position, longitudinally slidable with respect to each other within the sleeve 10 for the purpose of adjusting the length of the combined arms 11 and 12.

The retaining members 13 and 14 are identical, each consisting of a rectangularly shaped, thin, flat piece of lead or other malleable metal, provided with a relatively long and narrow slot 25. The slot is shaped to permit the terminal 24 to be passed therethrough.

An automobile license plate is designated 26 and a supporting frame 27. The plate 26 may be fastened to the frame 27 either near the top or bottom edge of the plate. First the flat, straight end 20 of one of the spring arms 11 or 12 is inserted into the sleeve 10 from one end of the sleeve, and then the end 20 of the other of said spring arms is inserted into the opposite end of said sleeve 10, so that the spring arms protrude from the sleeve in opposite directions and are slidable therein to provide for adjustment of the combined length of the arms.

License plates are provided with openings adjacent their edges and these openings register with similar apertures in the supporting frames 27. After the length of the assembled sleeve and spring arms has been adjusted as required by the location of the openings in the license plate, the sleeve portion 10 is placed in face abutting position on the plate and the terminal 24 of one of the spring arms is inserted through the registering openings in the plate and support. A retaining member, 13, is slipped over the terminal 24 and given a 90 degree turn to lock it in place. Then the terminal 24 of the other of the spring arms is inserted through registering openings in the plate and support and the other retaining member, 14, is slipped over the terminal and given a 90 degree turn to lock it in place.

Figure 2:
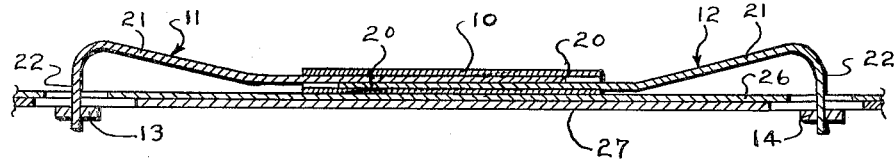
Fig. 2 is a horizontal sectional view of the mounting device as it appears when in operative position relatively to a license plate and its supporting frame.
Figure 3:
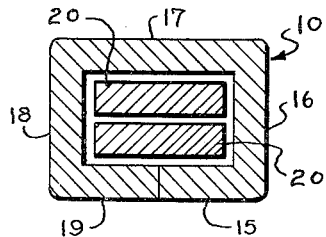
Fig. 3 is a vertical transverse sectional view, on an enlarged scale, taken in the plane of the line 3—3 of Fig. 1.
Figure 4:
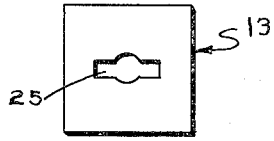
Fig. 4 is a plan view of the retaining means of the mounting device, detached.
Figure 5:
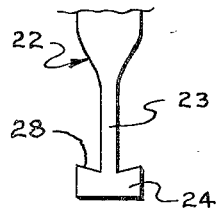
Fig. 5 is a side elevation of the outer end portion of one of the spring arms of the mounting device.

It will be observed that the divergent angles at which the spring arm portions 21 and 22 extend when the mounting device is free, as in Fig. 1, and when the device is in operative position on a license plate, as in Fig. 2, are not identical. This is due to the fact that the mounting device, particularly the arms 11 and 12, are put under tension or stress when in the operative position. The outwardly directed portions 21 and the inwardly directed portions 22 of the spring arms are so formed that the terminals 24 fall short of reaching the vertical plane of the plate abutting surface of the sleeve 10, whereas after the device has been forced into plate-fastening position, said terminals 24 extend beyond the vertical plane of the plate 26 sufficiently to permit said terminals to extend through the openings in the plate and support, and to receive the retaining means 13 and 14 on the shanks 23 for locking the mounting device in its intended relationship to the license plate.

In its operative position, the sleeve portion 10 of the device bears yieldingly against the face of the plate 26, near the center of either its top or bottom edge, and the retaining means 13 and 14 bear yieldingly against the rear of the supporting frame 27, holding the oppositely curved or directed portions 21 and 22 of the arms under tension resulting from the tendency of the parts to resume their original unstressed positions as illustrated in Fig. 1. A comparison of Figs. 1 and 2 will show that in order to force the spring arms into plate engaging positions, the parts 22 and 23 thereof must be brought into substantially perpendicular position with respect to the plate 26 and sleeve 10 (Fig. 2) and the angle between the parts 21 and 22 is less than the angle between said parts when they are free as in Fig. 1, before stress has been imparted to the arms to put them into the position of Fig. 2.

Obviously the exact form of the spring arms may be varied. They may be curved or bowed outwardly in the region of the parts 21 and 22 instead of bent to provide the relatively straight portions 21 and 22 shown in the drawings.

It will be understood that when the retaining member 13 or 14 is placed on a terminal 24, the elongated slot 25 will extend transversely of the spring arm, and that when the retaining member is given a 90 degree turn, the slot 25 will extend longitudinally of the spring arm but transversely of the terminal, and the shoulders 28 on the terminal 24 will bear against the under side of the retaining member and prevent it from separating from the spring arm. Due to the soft character of the metal composing the retaining devices 13, 14, combined with the tendency of the spring arms to pull the terminals 24 toward the back of the plate 26, a firm engagement is achieved between the terminals 24 and retaining devices 13 and 14 and unintentional turning of the retaining devices is prevented.

The tendency of the spring arms to return to their unstressed positions (Fig. 1) after having been forced into the relationship shown in Fig. 2 causes the sleeve 10 to yieldingly bear in one direction, against the face of the plate, and causes the retaining devices 13 and 14 to yieldingly bear in the opposite direction against the reverse side of the plate and support. This natural tendency of the device coupled with the soft quality of the retaining devices, insures a firm, noiseless, vibrationless mounting of the plate on its support.

Details of construction and the form of the parts may be altered without departing from the scope of my invention as set forth in the appended claims.

I claim:

1. An adjustable device for mounting an automobile license plate on a supporting frame, comprising a pair of spring arms extending in opposite directions each having a straight inner end portion and an outwardly bowed portion terminating in a reduced shank and a terminal device consisting of oppositely extending lateral projections on the end of said reduced shank, the shank and terminal device being disposed substantially at right angles to the straight inner end portion and the terminal device being in approximate alignment with the said inner end portion before the mounting device is placed into operative position on the plate, means loosely and telescopically engaging the straight inner end portions of the spring arms and holding them in parallel relationship while permitting free longitudinal movement of the arms relatively to each other therein, said spring arm engaging means bearing yieldingly against one face of the license plate, and threadless retaining means consisting of an apertured piece of relatively rigid material engaging the reduced shanks of the spring arms after said terminal devices have been passed through registering apertures in the plate, frame and retaining means, said terminal devices on the ends of the spring arms bearing yieldingly against the threadless retaining means, and the latter bearing against the frame and plate and exerting pressure in a direction opposite that imposed by the bearing of the spring arm engaging means on the opposite side of the plate.

2. An adjustable device for mounting an automobile license plate on a supporting frame, comprising a pair of narrow, flat strips of spring metal forming spring arms extending in opposite directions, each having a straight inner end portion and an outwardly bowed portion terminating in a reduced shank and a terminal device consisting of oppositely extending lateral projections on the end of said reduced shank, the shank and terminal device being disposed substantially at right angles to the straight inner end portion and the terminal device being in approximate alignment with the said inner end portion before the mounting device is placed into operative position on the plate, a flat sided sleeve loosely and telescopically engaging the straight inner end portions of the spring arms and holding them in parallel relationship while permitting free longitudinal movement of the arms relatively to each other therein, said spring arm engaging sleeve bearing yieldingly against one face of the license plate, and threadless retaining means consisting of an apertured piece of relatively rigid material engaging the reduced shanks of the spring arms after said terminal devices have been passed through registering apertures in the plate, frame and said retaining means, said terminal devices on the end of the spring arms bearing yieldingly against the threadless retaining means, and the latter bearing against the frame and plate and exerting pressure in a direction opposite that imposed by the bearing of the spring arm engaging means on the opposite side of the plate.

3. The automobile license plate mounting device defined by claim 1 in which the threadless retaining means consists of an apertured piece of soft metal.

VIRGIL T. MEAGHER.

REFERENCES CITED

The following references are of record in the file of this patent:

UNITED STATES PATENTS

| Number | Name | Date |
|---|---|---|
| 409,621 | Welch | Aug. 20, 1889 |
| 1,615,698 | Hartzell | Jan. 25, 1927 |